United States Patent [19]

Brandt

[11] Patent Number: 5,649,561
[45] Date of Patent: Jul. 22, 1997

[54] FUEL FILTER AND PRESSURE REGULATOR SYSTEM

[75] Inventor: Timothy B. Brandt, West Des Moines, Iowa

[73] Assignee: Parr Manufacturing, Inc., Des Moines, Iowa

[21] Appl. No.: 642,632

[22] Filed: May 3, 1996

[51] Int. Cl.$^6$ ............................ F02M 37/04; G05D 16/08
[52] U.S. Cl. ...................................... 137/115.13; 123/511
[58] Field of Search .................... 137/115.13, 115.26, 137/115.27; 123/510, 511, 457

[56] References Cited

U.S. PATENT DOCUMENTS

| | | | |
|---|---|---|---|
| 5,078,167 | 1/1992 | Brandt et al. | 137/549 |
| 5,402,817 | 4/1995 | Bueser | 137/549 |
| 5,433,241 | 7/1995 | Robinson | 137/115.13 |

*Primary Examiner*—Thomas N. Moulis
*Attorney, Agent, or Firm*—Henderson & Sturm

[57] ABSTRACT

A combination fuel pressure regulator and fuel filter apparatus for vehicle fuel systems has a fuel supply tank with a fuel pump therein for pumping fuel to a fuel supply rail having fuel injectors attached thereto. A fuel filter is operably disposed between an inlet supply tube and a fluid outlet tube for filtering impurities from fuel passing therethrough. A valve in fluid communication with the inlet supply tube is provided with a regulator for causing flow to be short circuited back into the fuel supply tank when the pressure in the fluid outlet, compared to a reference pressure, exceeds a first predetermined level. The valve is biased to a closed position and will remain closed at one differential pressure of the clean side of the filter, compared to a reference pressure, whereby all of the fuel in the inlet supply tube will pass through the filter. The internal reference pressure is isolated so that it can be chosen to be from one of many sources at a different differential pressure between the predetermined pressure and the reference pressure, indicating that no more fuel is needed in the fuel rail, the valve will open to allow fuel to return to the fuel tank.

21 Claims, 4 Drawing Sheets

FUEL FILTER AND PRESSURE REGULATOR SYSTEM

TECHNICAL FIELD

This present invention relates to a vehicle fuel supply system and more particularly to a fuel filter and fuel regulator system which regulates the fuel on the upstream side of the filter in response to a pressure differential between the pressure on the downstream side of the filter and a chosen reference pressure.

BACKGROUND ART

The present invention is an improvement over U.S. Pat. No. 5,078,167 issued on Jan. 7, 1992 and entitled FUEL FILTER AND PRESSURE REGULATOR SYSTEM APPARATUS.

In most vehicles having a fuel injection system, such as that shown in U.S. Pat. No. 4,633,901 to Brandt, et al., one fuel line leads from a fuel pump in the tank, through a fuel filter to the engine fuel rail and ultimately to the fuel injectors. The amount of fuel is controlled by a pressure regulator disposed adjacent to the fuel rail and consequently, is located a relatively long distance from the fuel tank. This requires a fuel return line to return unused fuel to the fuel tank.

One of the problems with aforementioned prior art is that there is additional expense in having a fuel rein line and furthermore if this line is broken for any reason, such as in an accident, the fuel could create a fire hazard.

For this reason and others, returnless fuel filter and regulator systems have been proposed, for example, by having the pressure regulator located in the inlet line from the fuel tank, but located adjacent to or attached to the fuel tank. In such a system, then all of the fuel would first pass through a fuel filter before reaching the pressure regulator valve, and if more fuel reaches the regulator valve than needs to be delivered to the fuel rail, then the regulator valve will merely drop the excess fuel back into the tank directly.

Still another returnless system proposed uses a pressure transducer at the fuel rail connected to an engine control computer which controls a variable voltage drive for the fuel pump located in the fuel tank. A fuel filter is of course, used in the fuel line leading from the fuel pump to the fuel rail at the engine injectors. One of the major problems with this type of system is that it is expensive, for example, especially the pressure transducer, variable voltage drive and the type of fuel pump required for use with this system. Furthermore, if the vehicle is accelerating rapidly such that the drive is moving fast, the inertia of the fuel pump could produce excess fuel if the vehicle needs to stop immediately, and this could cause flooding of the engine.

In the first two systems referred to above, since all of the fuel which goes to the regulator must be filtered, a larger filter is required than if only the fuel which actually goes to the fuel rail is filtered. In other words, the return line which dumps fuel back into the fuel tank is dumping clean, filtered fuel back into a tank of unfiltered fuel. This will cause more deposits on the filter than would otherwise be necessary and that is the reason why a larger filter is needed than would be needed for the present invention. It is, of course, well known that as filter becomes clogged with impurities, it will create an increasingly greater pressure drop across the filter. If this pressure drop becomes too great, the required pressure delivered to the fuel rail will be insufficient and the fuel injection system will not operate properly.

The foregoing problems have been previously addressed in U.S. Pat. No. 5,078,167 wherein a valve in fluid communication with the fuel inlet supply tube is provided with a regulator positioned downstream oft he fuel filter for causing the fuel flow to be short circuited back into the fuel supply tank when the pressure in the fuel outlet exceeds a predetermined level. The valve is biased to a closed position and will remain closed when the pressure on the clean side of the filter is below the predetermined pressure, whereby all of the fuel in the fuel inlet supply tube will pass through the filter when the pressure in the fuel outlet is below the predetermined pressure.

While this patented device offers significant advances over the prior art, it is desirable to have a regulator/filter of this type which is responsive to reference pressures other than just the fuel tank pressure as compared to the filter outlet pressure.

Accordingly, there is a need for an improved fuel regulator system which will overcome the aforementioned problems with the prior art.

DISCLOSURE OF THE INVENTION

Briefly stated, the present invention relates to a combination fuel pressure regulator and fuel filter apparatus for vehicle fuel systems has a fuel supply tank with a fuel pump therein for pumping fuel to a fuel supply rail having fuel injectors attached thereto. A fuel filter is operably disposed between an inlet supply tube and a fluid outlet tube for filtering impurities from fuel passing therethrough. A valve in fluid communication with the inlet supply tube is provided with a regulator for causing flow to be short circuited back into the fuel supply tank when the pressure in the fluid outlet exceeds a predetermined value compared to a reference pressure. The valve is biased to a closed position and will remain closed when the pressure on the clean side of the filter is below the predetermined pressure whereby all of the fuel in the inlet supply tube will pass through the filter when the pressure in the fluid outlet is below the predetermined pressure compared to a reference pressure.

An intermediate reference pressure chamber is disposed in a surrounding relationship relative to the fuel return chamber which is supported on opposite ends by flexible diaphragms; wherein, the intermediate reference pressure chamber is in open fluid communication with a reference pressure port connected to the engine intake manifold (or other source of reference pressure) such that the reference pressure acts on both of the flexible diaphragms that support the fuel return chamber containing the regulator valve.

An object of the present invention is to provide an improved fuel filter and fuel regulator system for vehicles.

A further object of the present invention is to provide a vehicle fuel supply system which is less expensive than prior art systems, but which has advantages over such prior art systems.

A still further object of the present invention is to provide a fuel supply system which filters only that fuel which passes onto the fuel supply rail instead of dumping filtered fuel back into the fuel tank during the process of maintaining the desired pressure and flow to the fuel rail as is the practice in prior art systems.

A still further object of the present invention is to minimize the amount of static electricity which inherently is produced during the process of pumping fuel through a fuel regulator.

Another object of the present invention is to provide a fuel supply system which is not primarily sensitive to the pressure differential between the fuel tank pressure and the pressure downstream of the filter, but to the pressure differential generated by a reference pressure which can be chosen to be one of several reference pressures.

Yet, another object of the present invention is to provide a fuel supply system that will maintain a constant air/fuel ratio.

Still another object of the present invention is to provide a fuel supply system which employs a controlling reference pressure which can be different from the fuel tank pressure.

Still another object of the present invention is to provide a fuel supply system that will allow this return flow pressure to exceed the fuel tank pressure so that the excess pressure may drive other engine components as a venturi or jet pump or the like.

Other objects, advantages and novel features of the present invention will become apparent from the following detailed description of the invention when considered in conjunction with the accompanying drawings.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
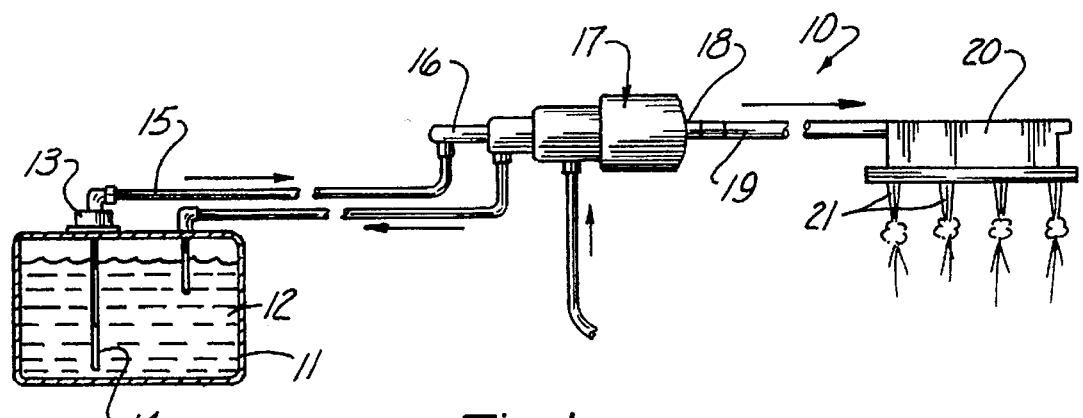
FIG. 1 is a side elevational and partly cross-sectional schematic view of a fuel supply system constructed in accordance with the present invention.

As mentioned previously, this invention is an improvement of U.S. Pat. No. 5,078,167 which is incorporated herein by reference; and, wherever possible like reference numerals will be employed throughout the specification.

Referring now to the drawings, wherein like reference numerals designate identical or corresponding parts throughout the several views, FIG. 1 shows a fuel supply system (10) constructed in accordance with the present invention and having a fuel tank (11) with liquid fuel (12) disposed therein. Fuel pump (13) which is preferably electrically operated, constantly draws fuel from an inlet port (14) and delivers it through an outlet port (15) to a fuel pump supply port (16) of a combination fuel filter and fuel regulator (17). An outlet supply tube (18) of the combination filter and pressure regulator (17) is operatively connected to a line (19) leading to fuel supply rail (20) having a plurality of fuel injectors (21) attached thereto for supplying fuel to an engine (not shown). This fuel supply rail is but one example of a fluid conduit leading to a fuel metering device (not shown) such as fuel injectors, a carburetor, a single point fuel injector, etc.

Figure 2:
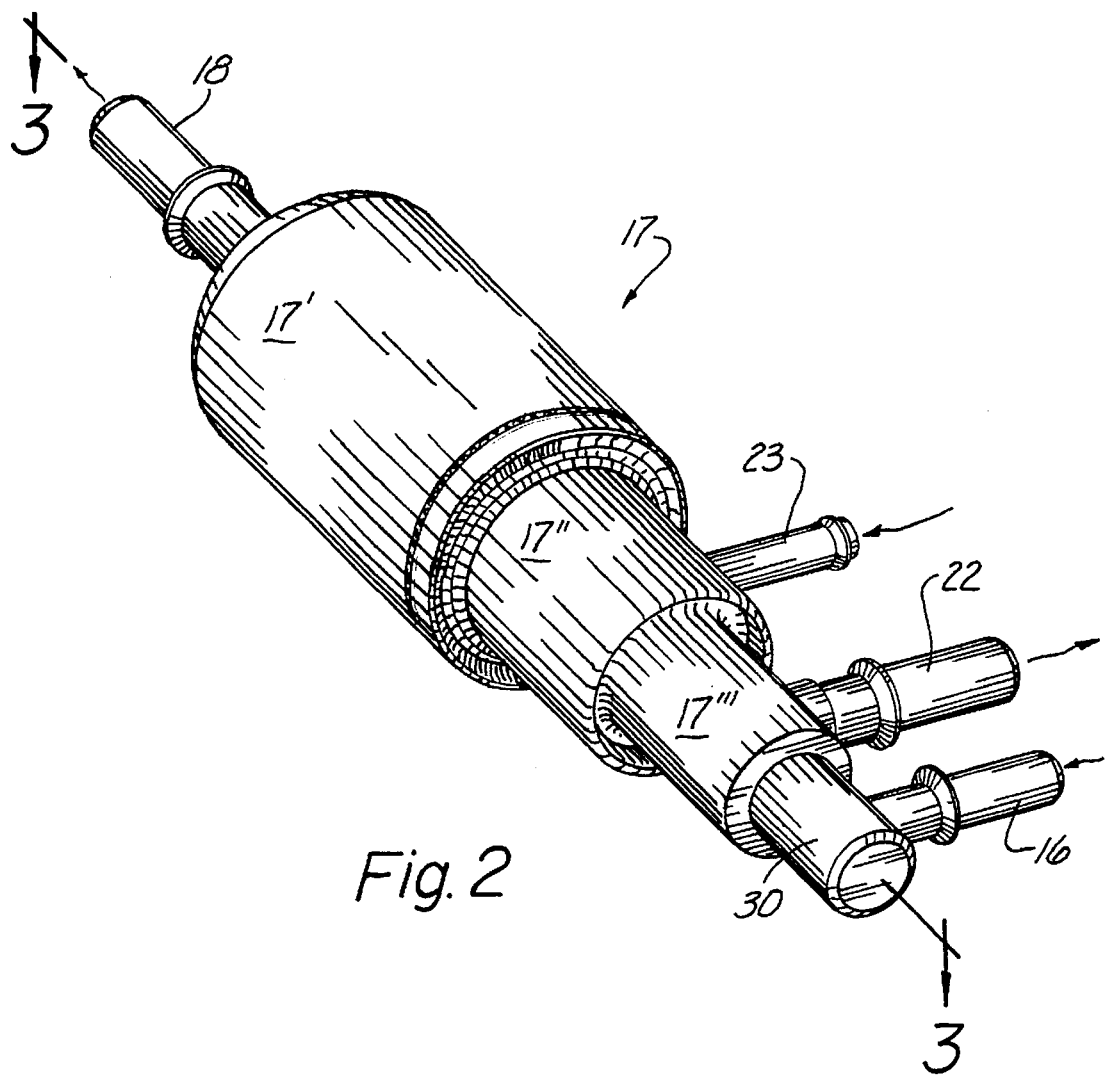
FIG. 2 is an isolated perspective view of the exterior of the pressure regulator system housing.

As shown in FIG. 2, the fuel filter and regulator is provided with an upper housing portion (17') an intermediate housing portion (17") and a lower housing portion (17'''); wherein the lower housing portion (17''') is operatively connected to the fuel pump supply port (16) and a fuel tank return line (22); the intermediate housing portion (17") is connected to reference pressure port (23), and the upper housing portion (17') is connected to the outlet supply tube (18). The reference pressure port can connect to any reference pressure desired, such as the intake manifold, the carbon canister that collects vapors in evaporative emission systems, atmospheric pressure, fuel tank pressure, etc.

Figure 3:
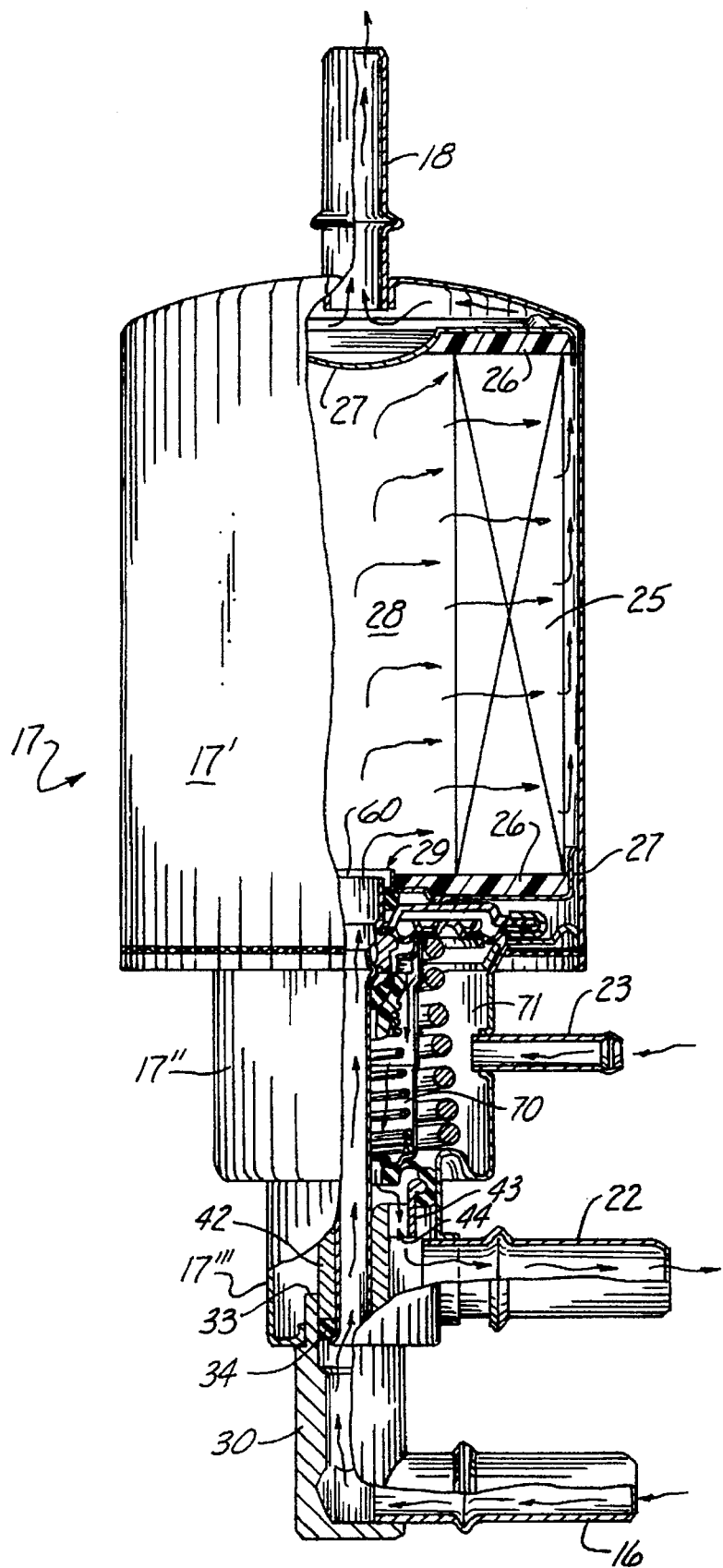
FIG. 3 is a partial cross-sectional view taken through line 3—3 of FIG. 2.
Figure 4:
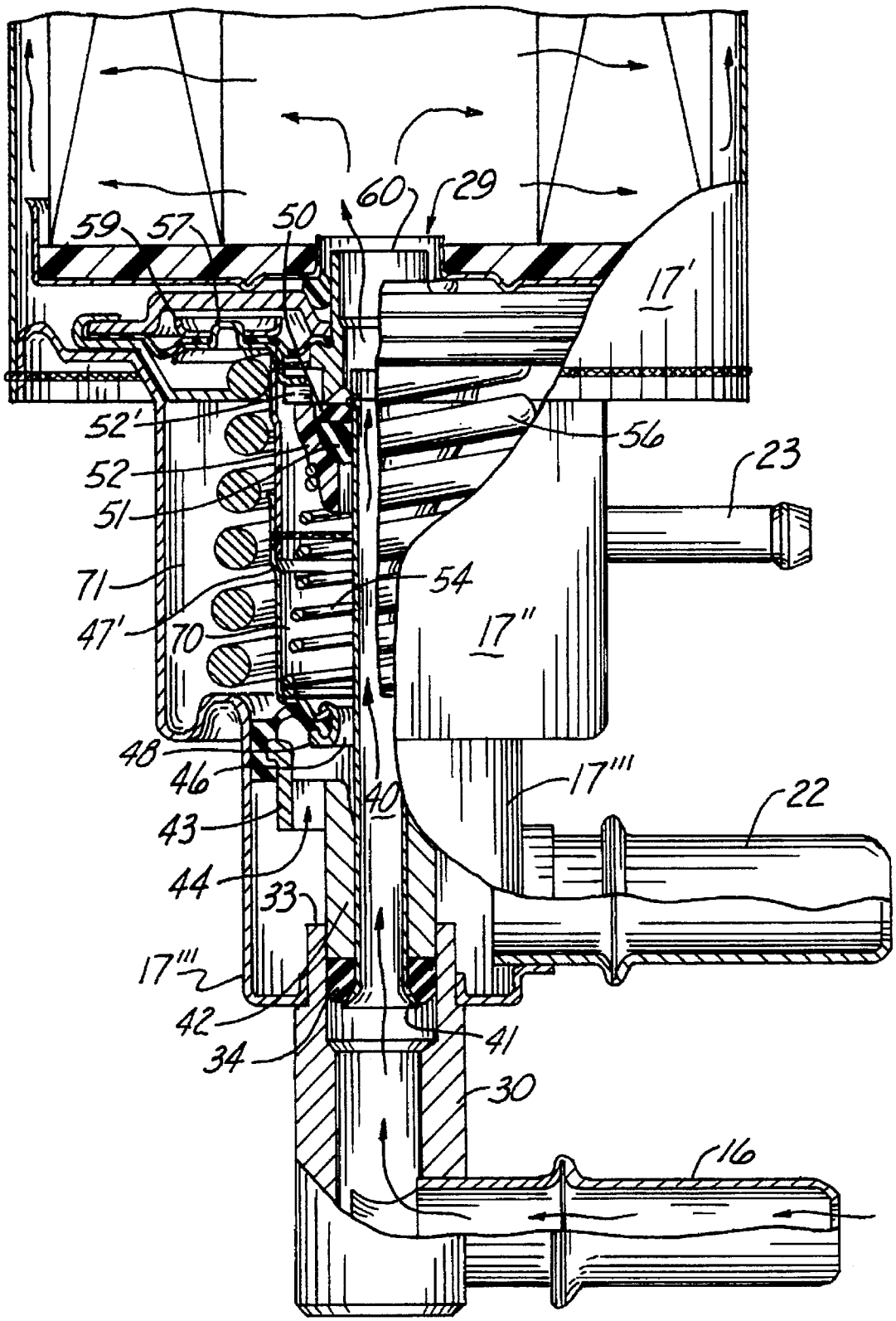
FIG. 4 is a partial cross-sectional view showing the lower portion of the pressure regulator system with the pressure regulator valve in the closed position.
Figures 5, 6:
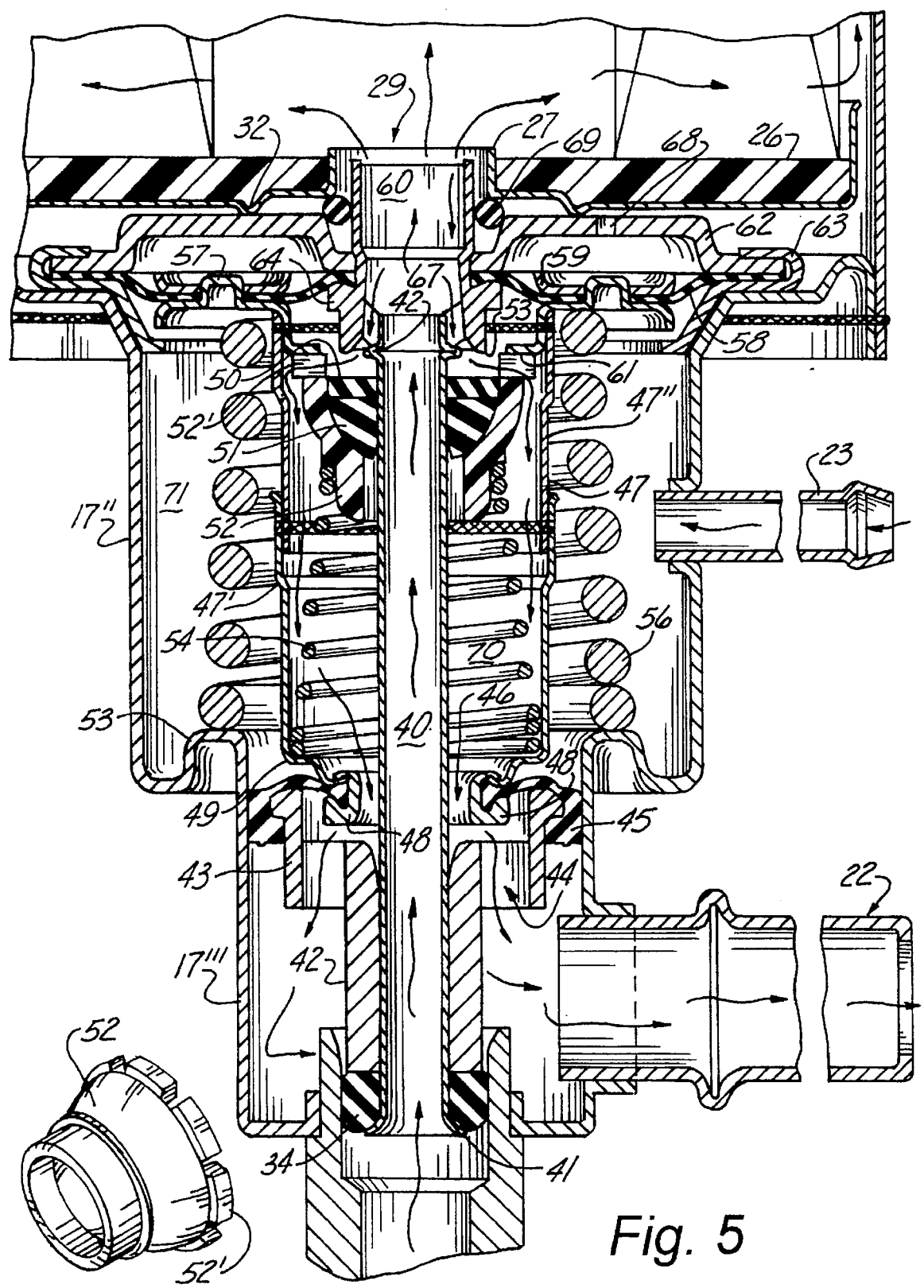
FIG. 5 is an enlarged detail view of the lower portion of the pressure regulator system with the pressure regulator valve in the open position under the influence of the reference pressure in the intermediate pressure chamber.
FIG. 6 is a perspective view of the valve seat holder member.

Turning now to FIGS. 3 through 5, it can be seen that an annular filter (25), which can be constructed of any normal filter material, such as paper, is sealed at the top and bottom thereof by members (26) and (27) to cause all of the fuel which enters the interior chamber (28) of the filter to be forced through filter (25) and not be permitted to go around it. The upper housing portion (17') generally defines the filter chamber downstream of the filter (25) which only would contain clean filtered fuel and which has outlet supply tube (18) attached thereto.

Lower closure member (27) is further provided with an annular opening (29) whose purpose and function will be described presently, and the closures (27) are further provided with nubs or projections (32) which space the filter (25) from the upper housing portion (17').

As can best be seen by reference to FIGS. 3 and 4, the lower housing portion (17''') is provided with a fluid coupling member (30) operatively connected on one end to the fuel pump supply port (16) and disposed in open fluid communication on the other end with the bottom of the lower housing portion (17''').

The upper end of the fluid coupling member (30) projects through the bottom of the lower housing portion (17''') and has an annular projection (33) dimensioned to receive a rubber or elastomeric o-ring (34) in place. In addition, the o-ring (34) sealingly surrounds the flared lower end (41) of an elongated fuel pump supply tube (40) which extends from the lower housing portion (17''') into the upper end of the intermediate housing portion (17").

In addition, the lower end of the fuel pump supply tube (40) is further provided with a generally rigid annular member (42) having an outwardly projecting apertured upper portion (43) provided with ports (44) for permitting pressurized fuel to flow from the lower housing portion (17''') through the fuel tank return line (22) which is in communication with one side of the lower housing portion, as will be explained in greater detail further on in the specification.

The outwardly projecting upper portion (43) of the annular member (42) is also dimensioned to sealingly engage the outer periphery of a lower diaphragm member (45) against the interior walls of the lower housing portion (17'''). The lower diaphragm (45) is further provided with an annular opening (46) which is in fluid communication with the interior of an isolator sleeve (47) centrally disposed within the intermediate housing portion (17").

The lower portion (47') of the isolator sleeve (47) is sealingly engaged to the inner periphery of the lower diaphragm member (45) via an annular clamp (48) which forms a fluid passageway between the intermediate (17") and lower (17''') housing portions.

In addition, the lower portion of an inner fluid chamber (70) formed by isolator sleeve (47) is provided with a bearing surface (49) which supports the lower end of a compression spring (54) wherein the upper end of the compression spring supports an elastomeric valve seat (50) disposed in the top of a member (51) which has partially spherical convex outer surface in abutment with a mating concave spherical inner surface on member (52) so that the valve seat (50) can automatically and universally align itself with the valving surface (53) on the bottom of valve tube in the closure mode shown in FIG. 4. A compression spring (54) biases the annular member (52) upwardly, which will, in turn, push the member (51) and annular elastomeric valve seat (50) toward the closed position shown in FIG. 4.

Another spring (56) which is considerably larger and produces a greater force, abuts member (53) in the lower housing portion (17''') in a surrounding relationship to the isolator sleeve (47) as shown in FIG. 5 and pushes on beating member (57) and on the upper annular diaphragm (58), which is disposed between the bearing member (57) and a backing member (59). A bottom annular portion (61) on member (57) abuts the top of member (52). The diaphragm (58) is sealingly clamped by members (62) and (63) on the exterior periphery thereof and the annular diaphragm (58) is sealingly clamped between members (62) and flange (64) on tube (60) on the interior of the diaphragm (58).

In addition, the upper portion (47'') of the isolator sleeve (47) is connected to the bottom annular portion (61) on bearing member (57) to form an inner fluid chamber (70) within the isolator sleeve (47); wherein, the inner fluid chamber (70) surrounds the fuel pump supply tube, and to form an outer fluid chamber (71) between the intermediate housing portion (17'') and the isolator sleeve (47), wherein the outer fluid chamber (71) is in open fluid communication with the reference pressure port (23).

As can be seen by reference to FIG. 5, the lower portion of the valve tube (60) is provided with a plurality of ribs (67) which engage the upper portion (42) of the fuel pump supply tube (40) to fixedly secure the fuel pump supply tube (40) within the valve tube (60). Furthermore, the valve tube (60) is centrally disposed within the annular opening (29) in the filter (25) by a rubber or elastomeric gasket (69) compressed between the lower closure member (27) the valve tube (60) and member (63). Furthermore, member (62) is provided with openings (68) such that the top surface of the upper diaphragm (58) is exposed to the fuel pressure in the upper housing portion (17').

The reference pressure in the outer fluid chamber (71) exerts pressure both on the bottom of the outer periphery of the upper diaphragm member (58) and the top of the lower diaphragm member (45) to affect the spring biasing influence of the compression spring (54) within the isolator sleeve (47).

In one mode of operation, the heavy diaphragm biasing spring (56) will push the diaphragm (58) upwardly until it abuts the bottom of bottom member (62), the smaller valve spring (54) will push members (51), (52) and consequently, annular valve seat (50) upwardly against the sealing annular surface (55) of the bottom of valve tube (60). This will cause all of the flow from the fuel pump (13) to pass up through the fuel pump supply tube, (40), through valve tube (60), into the interior chamber (28) of the filter (25) and then force this fuel through the filter (25) to be delivered to the fluid outlet (18). Such fuel then is forced on through connection line (19), fuel rail (20) and ultimately is delivered out fuel injectors (21) to the engine.

Because of the way these systems are designed, the pressure at the fuel rail must remain constant within certain tolerances. If the pressure increases on the downstream side of the filter (25), for example, at fluid outlet (18), which is essentially the same pressure as that chamber inside of the upper housing portion (17') and outside of the filter (25), this will cause the diaphragm (58) to be pushed downwardly against the upward bias of the spring (56) to the lowered position. As the diaphragm (58) moves downwardly, the flange (61) on annular member (57) will push the member (52) downwardly, overcoming the bias of spring (54) which is pushing the member (52) upwardly. Because of the pressure inside of valve tube (60), the elastomeric seal (50) will move to the position shown in FIG. 5 whereby the flow through tube (40) will flow through openings (46) and (44) and then from the lower housing portion (17''') out through the fuel return port (22).

As the pressure on the downstream side of the filter (25), for example, at fluid outlet (18), decreases due to consumption of fuel at the fuel injectors (21), the upper diaphragm (58) will tend to rise thereby stopping or lessening the flow through return passageways (46) and (44). This will cause metering of the flow back to the fuel return port as required to maintain the desired pressure of clean fuel at fluid outlet (18).

In the preferred mode of operation depicted in FIG. 5, a reference pressure will be introduced through reference pressure port (23) into the outer fluid chamber (71) within the intermediate housing portion (17''). The reference pressure within the outer fluid chamber will tend to push up on the upper (58) diaphragm and down lower (45) diaphragm away from one another, and upon the upper diaphragm (58) and exert a much smaller downward force on the lower diaphragm. Thus the majority of the biasing pressure effectively operates on the main area of the diaphragm (58) in almost a 1:1 ratio.

Back pressure from the return fuel port is exerted on the diaphragm (45) but the area of the lower diaphragm is much less than the area of the main diaphragm so that the output of the regulator is not greatly influenced by the pressure at (22). The extent of movement of the valve seat (50) toward or away from the valve member (53) is determined by the balance between the pressure above diaphragm (58), such pressure being essentially the outlet pressure of the filter at outlet port (18). Pushing in the opposite direction is the combined force of the spring (56) and force exerted by pressure in chamber (71) exerted over the area to which the pressure (71) is applied.

In the preferred mode of operation, the reference pressure port (23) could be attached to the intake manifold of a turbo-charged engine. In that arrangement, as the pressure of the air going into the engine increases, there is a corresponding increase in the fuel pressure in the intake manifold and this increased pressure will be transmitted to outer chamber (71) in the intermediate housing portion (17''), which, in combination with the pressure at port (18) on the other side of diaphragm (58), will control the opening of the valve seat (50).

Accordingly, it will be appreciated that the present invention does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. A combination fuel pressure regulator and fuel filter apparatus for vehicle fuel systems comprising:

a fuel supply tank having a fuel tank pressure;

a housing operatively connected to said fuel supply tank;

an inlet supply tube attached to said housing adapted to be in fluid communication with a fuel pump;

a fluid outlet attached to said housing adapted to be in fluid communication with a fuel supply device to an engine;

a fuel filter means disposed within said housing and disposed between said inlet supply tube and said fluid outlet for filtering impurities from substantially all of the fuel passing to said outlet;

valve means in fluid communication with said inlet supply tube for causing flow to be directed into said fuel supply tank through a fuel return port when the outlet pressure in said fluid outlet, compared to a reference pressure, exceeds a first predetermined value;

valve biasing means for biasing said valve means closed when said outlet pressure, compared to said reference pressure, is below said first predetermined value whereby all of the fuel in said inlet supply tube will pass through said filter when the outlet pressure in said fluid outlet, compared to said reference pressure, is below said first predetermined value; and isolation means for isolating said reference pressure from said fuel tank pressure whereby one of several reference pressures can be selected.

2. The apparatus as in claim 1; wherein, said isolation means includes pressure responsive means for affecting the force exerted by the valve biasing means in response to said reference pressure.

3. The apparatus as in claim 1; wherein, said housing comprises:

an upper housing portion in fluid communication with said fluid outlet and containing said fuel filter means an intermediate housing portion in fluid communication with said reference pressure; and a lower housing portion in fluid communication with both said inlet supply tube and said fuel return port.

4. The apparatus as in claim 3; wherein, said intermediate housing portion is further provided with an isolator sleeve which forms an outer pressure chamber and an inner pressure chamber within the intermediate housing portion.

5. The apparatus as in claim 4; wherein, said isolator sleeve is suspended within the intermediate housing portion by a pair of diaphragms.

6. The apparatus as in claim 5; wherein, said pair of diaphragms comprise:

a first diaphragm disposed in the lower housing portion and operatively connected to the isolator sleeve via an annular clamp forming a fluid passageway into the inner pressure chamber; and a second diaphragm disposed in an upper housing portion and provided with a bearing member which is operatively connected to the isolator sleeve.

7. The apparatus as in claim 6; wherein, said fluid passageway is dimensioned to receive a fuel pump supply tube and is in fluid communication with said fuel return port.

8. The apparatus as in claim 4; wherein, said valve biasing means comprise a relatively stronger spring, disposed in the outer pressure chamber and a relatively weaker spring disposed in the inner pressure chamber.

9. The apparatus as in claim 8 further comprising:

a fuel pump supply tube secured on one end in said lower housing portion, having an intermediate portion which extends through the inner pressure chamber in the intermediate housing portion and operatively associated on the other end with said valve means.

10. The apparatus as in claim 9; wherein, said relatively weak spring, is disposed in a surrounding relationship with respect to said fuel pump supply tube and operatively connected on one end to said valve means.

11. The apparatus as in claim 10; wherein, said isolator sleeve is movable relative to said intermediate housing portion.

12. The apparatus as in claim 5; wherein, said pair of diaphragms comprise an upper diaphragm connected to one end of the isolator sleeve and a lower diaphragm connected to the other end of the isolator sleeve.

13. A vehicle fuel system comprising:

a fuel supply tank having a fuel supply tank pressure;

a fuel supply conduit to an engine;

a fuel pump;

a housing operatively connected to said fuel supply tank;

an inlet supply tube attached to said housing and being in fluid communication with said fuel pump;

a fluid outlet attached to said housing and being in fluid communication with said fuel supply conduit;

a fuel filter means disposed within said housing and disposed between said inlet supply tube and said fluid outlet for filtering impurities from substantially all of the fuel passing to said outlet;

valve means in fluid communication with said inlet supply tube for causing flow to be short-circuited back into said fuel supply tank through a fuel return port before it passes through said fuel filter means when the outlet pressure in said fluid outlet, compared to a reference pressure, exceeds a first predetermined valve;

valve biasing means for biasing said valve closed when said outlet pressure, compared to said reference pressure, is below said first predetermined value whereby all of the fuel in said inlet supply tube will pass through said filter when the pressure in said fluid outlet, compared to said reference pressure, is below said predetermined value; and isolation means for isolating said reference pressure from said fuel supply tank pressure whereby one of several reference pressures can be selected.

14. The system as in claim 13; wherein said isolation means includes pressure responsive means for varying the force exerted by the valve biasing means in response to a reference pressure.

15. The system as in claim 13; wherein, the housing comprises:

an upper housing portion in fluid communication with said fluid outlet;

an intermediate housing portion in fluid communication with said reference pressure; and a lower housing portion in fluid communication with both said inlet supply tube and said fuel return port.

16. The system as in claim 15, further comprising:

a first pressure responsive diaphragm disposed between the upper and intermediate housing portions.

17. The system as in claim 15, further comprising:

an isolator sleeve suspended between the first and second pressure responsive diaphragms and forming an inner and an outer pressure chamber in said intermediate housing portion.

18. The system as in claim 15, wherein the outer pressure chamber is exposed to said reference pressure and said inner pressure chamber is in open fluid communication with the fuel return port.

19. The system as in claim 18; wherein, said valve means is disposed within said inner pressure chamber.

20. The system as in claim 19; wherein, said valve biasing means comprises:

a relatively strong spring operatively associated with said first pressure responsive diaphragm and disposed within said outer pressure chamber; and, a relatively weak spring operatively associated on one end with said valve means and operatively fixed on the other end with a beating surface on said isolation means.

21. The system as in claim 20; further comprising an elongated fuel pump supply tube in fluid communication with both the upper and lower housing portions and having an intermediate portion which extends through the second pressure responsive diaphragm and said inner pressure chamber.

* * * * *